June 27, 1950      T. F. I. TOMLINES      2,513,217

GEAR TRAIN

Filed Jan. 7, 1946

INVENTOR.
Thomas F. I. Tomlines
BY
M. C. Hayes

ATTORNEY

Patented June 27, 1950

2,513,217

UNITED STATES PATENT OFFICE 2,513,217

GEAR TRAIN

Thomas F. I. Tomlines, Rockville Centre, N. Y., assignor to the United States of America as represented by the Secretary of the Navy Application January 7, 1946, Serial No. 639,672

1 Claim. (Cl. 74—409)

This invention relates to gear trains. Its object is to provide an improved mechanism for eliminating backlash in a speed-change drive train, and more particularly in speed-reduction gearing.

In accomplishing the above object, a speed-reduction gearing unit is provided in addition to a primary drive train and is mounted for rotation of its axis about the axis of a gear in the primary drive train. A spring connected between the rotatable mounting and the stationary frame effects elimination of backlash in the primary drive train in a simple and effective manner.

Figure 1:
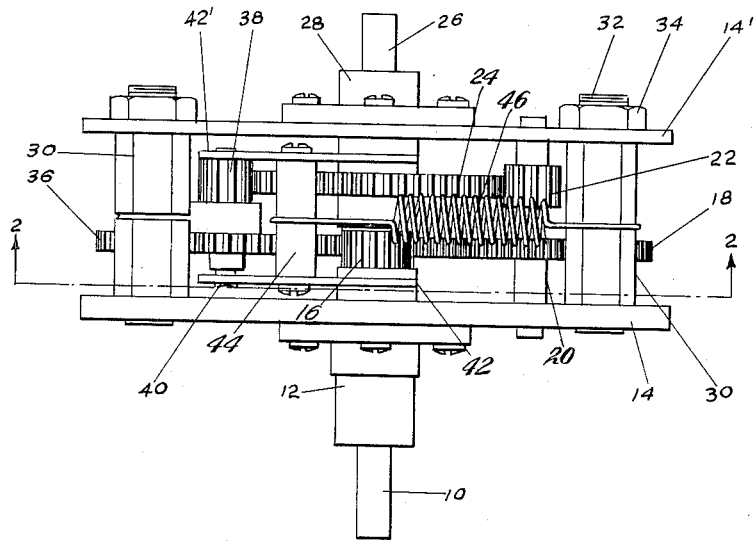
Figure 2:
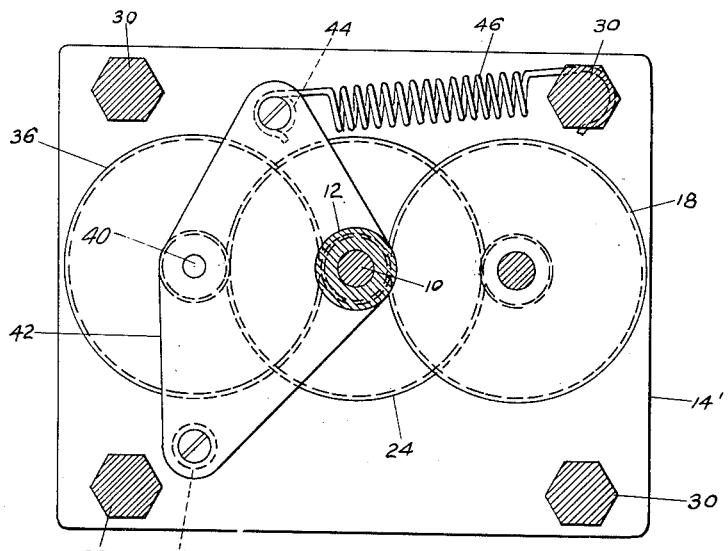

The invention will be better understood from the following detailed disclosure and from the drawing, in which Fig. 1 is a plan view of a gear train, showing a preferred embodiment of the invention; and Fig. 2 is a lateral section along the line 2—2 in Fig. 1.

A drive shaft 10 is mounted rotatably in bushing 12, which is supported by frame plate 14. Pinion 16, which is fixed on shaft 10, drives gear 18, mounted rigidly on shaft 20, which is mounted rotatably between frame plates 14 and 14'. Also fixed rigidly to shaft 20 is a pinion 22 in mesh with gear 24, which is fixed on driven shaft 26. Said shaft 26 is mounted in a bearing 28 supported in frame plate 14'. Frame plates 14 and 14' are spaced from each other by four spacing studs 30 threaded into plate 14, the studs acting to confine plate 14' through coaction of nuts 34 with threaded portions 32 on the studs. Shafts 10 and 26 are arranged adjustably for accurate axial alignment by suitable design of the supports (not shown in detail) for bearings 12 and 28.

For the purpose of preventing backlash in the above-described speed-reduction gearing, an additional gearing unit was provided in the prior art. Such structure included a primary gear drive train of the type shown as gears 16, 18, 22 and 24 in the drawing and a secondary gear drive train comprising a gear and pinion mounted on a shaft fixedly located, said gear meshing with pinion 16 and said pinion meshing with gear 24, with a spring provided between said gear and said pinion to take up the backlash in the entire primary drive gear train. That arrangement was not only difficult to make in that special construction of said gear, pinion and the spring coupling was required, but the device also required large components and was limited to use with only a spring of predetermined dimensions.

According to the present invention, the prior-art arrangement for preventing backlash is replaced by an improved organization. Gear 36 and pinion 38 may now be constructed as exact duplicates of gear 18 and pinion 22, respectively, and are arranged to rotate as a unit. Gear 36 and pinion 38 are fixed rigidly to shaft 40, which is mounted rotatably in a cradle or subframe comprising plates 42 and 42'. This subframe is supported on bearings 12 and 28 for arcuate motion about the axis along which shafts 10 and 26 are aligned. A pair of spacing elements 44 are fixed between plates 42 and 42'. Tension spring 46 is arranged between a spacer 44 and a spacing stud 30 (Fig. 2) to urge shaft 40 toward arcuate travel about the axis of shafts 10 and 26 in a clockwise direction, as shown in Fig. 2. Since spring 46 is mounted under such strong tension that the torque exerted is many times that needed to counter-balance the torque required to drive gear 24, power is transmitted immediately when gear 16 is rotated in a clockwise direction, and backlash in the primary gear drive train is prevented: Under the action of spring 46, the teeth of pinion 38 and gear 24 are brought into the position shown and gear 36 and pinion 38 tend to revolve about shafts 10 and 26 in a clockwise direction having the effect of tending to rotate shafts 10 and 26 at a one to one ratio. This brings the teeth of gear 36 and pinion 16 into the position shown, so that pinion 16 tends to rotate counter-clockwise. Continuing to follow these rotations, it is seen that gear 18 and pinion 22 tend to rotate clockwise, and that gear 24 is urged in a counter-clockwise direction. This is the desired condition, as the teeth at the junction of gear 24 and pinion 38 are maintained by the spring 46 in the relationship shown. Contact between gear teeth all the way through the primary gear train to the driven gear is thus established and maintained for rotation of the driving pinion 16 in either direction, and backlash, play or lost motion between gear teeth is eliminated.

Further analyzing operation, it is to be observed that, when drive shaft 10 is at rest, said shaft 10 and consequently pinion 16 and gear 24 are locked in position within the limits of backlash by gear train 16, 18, 22 and 24. The frame 42, 42', shaft 40, gear 36 and pinion 38 being rotatable about coaxial shafts 10 and 26, such rotation causes gear 36 and pinion 38 to roll along the circumferences of pinion 16 and gear 24 respectively. Such rolling action tends to cause less angular displacement of gear 36 than of pinion 38, due to the difference in diameter between said gear and said pinion, but such difference in angular displacement is precluded by the fact that gear 36 and pinion 38 are connected rigidly through shaft 40. This limits the rotation of frame 42, 42', shaft 40, gear 36 and pinion 38 to the amount of backlash in the gear train 16, 36, 38 and 24 and the gear train 16, 18, 22 and 24. Since the force exerted by spring 46 is applied to frame 42, 42' so as to cause rotation thereof, such rotation continues until limited by the amount of backlash in the gear trains. When so rotated, in effect a new fixed center has been established for shaft 40 in gear train 16, 36, 38 and 24, said center being so located as to prevent backlash in the gear train, and the speed reduction through the mechanism is obtained by simultaneous action of the two similar gear trains.

By integrally associating a shoulder portion and a set screw (not shown) with each of gears 18, 24 and 36, which are then rotatable on their shafts before tightening those screws, there may be angular adjustment between shafts 10 and 26 and, at the same time, angular adjustment for subframe 42, 42' so that spring 46 may be made to exert any desirable degree of tension, within limits.

It is evident that the provision of a subframe for supporting the backlash gearing simplifies the construction of the gearing and makes possible a reduction in the size of the components that would otherwise be necessary to enclose a sufficiently strong spring in the prior art construction. Spring 46 may be any ordinary tension spring of suitable strength. It is replaceable readily upon breakage and for substitution by springs of differing strengths. It is evident that a compression spring between the subframe and the main frame might be arranged, as well as a torsion spring for that subframe, to some extent sacrificing the simplicity of the disclosed embodiment.

In a broader aspect of the invention, it will be found that spring-urged arcuate travel of a single gear in the backlash train about a driving or driven gear in a speed-change system will accomplish the result desired, so long as the drive train remains unbroken; that the driving and driven gears need not be coaxial. The gear trains coupling the driving and driven gears may be replaced by any broadly equivalent drive means, as by one or more endless chains, and idler gears may be added when expedient. However, the invention is applied with particular advantage to the speed-change gear drive shown, and in the manner specified.

Various modifications and changes can be made in the subject device without departing from the scope of the invention.

I claim:

A gear train comprising a driving gear mounted rotatably in a frame, a driven gear mounted rotatably in said frame in axial alignment with said driving gear, a plurality of gears mounted in said frame and coupling said driving gear to said driven gear, a subframe mounted rotatably in said frame in axial alignment with said driving and driven gears, a pair of gears mounted fixedly on a common shaft, said shaft being carried rotatably in said subframe in axial parallelism with the axes of said driving and driven gears, said pair of gears meshing with said driving and driven gears respectively, and resilient means connecting said frame and subframe to urge said subframe toward arcuate travel about the axis of said driving and driven gears.

THOMAS F. I. TOMLINES.

REFERENCES CITED

The following references are of record in the file of this patent:

UNITED STATES PATENTS

| Number | Name | Date |
| --- | --- | --- |
| 106,360 | Hamlin | Aug. 16, 1870 |
| 1,067,144 | Schilling | July 8, 1913 |
| 1,200,876 | Ruetschi | Oct. 10, 1916 |
| 1,405,479 | Beitzell | Feb. 7, 1922 |
| 1,931,624 | Schwarze et al. | Oct. 24, 1933 |
| 1,987,674 | Ford | Jan. 15, 1935 |
| 2,016,149 | Leach | Oct. 1, 1935 |
| 2,062,804 | Braga | Dec. 1, 1936 |
| 2,247,839 | Halford | July 1, 1941 |
| 2,397,777 | Colman | May 2, 1946 |
| 2,404,865 | Semar | July 30, 1946 |

FOREIGN PATENTS

| Number | Country | Date |
| --- | --- | --- |
| 386,479 | Great Britain | Jan. 19, 1933 |